(12) United States Patent
Caponetto et al.

(10) Patent No.: US 6,526,008 B1
(45) Date of Patent: Feb. 25, 2003

(54) CONTROL DEVICE FOR A CD READER FOCUSING SYSTEM USING FUZZY LOGIC

(75) Inventors: Riccardo Caponetto, Catania (IT); Mario Di Guardo, Gravina di Catania (IT); Matteo Lo Presti, Misterbianco (IT); Luigi Fortuna, Siracusa (IT); Giovanni Muscato, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/473,363

(22) Filed: Dec. 28, 1999

(30) Foreign Application Priority Data

Dec. 29, 1998 (EP) .............................. 98830796

(51) Int. Cl.⁷ ................................................ G11B 7/00
(52) U.S. Cl. ................................ 369/44.35; 369/44.29; 369/44.34
(58) Field of Search .................... 369/44.34, 44.29, 369/44.25, 44.35, 44.27

(56) References Cited

U.S. PATENT DOCUMENTS

| | | | |
|---|---|---|---|
| 5,103,439 A | * | 4/1992 | Bierhoff et al. ........... 369/44.29 |
| 5,642,340 A | * | 6/1997 | Nomura .................... 369/44.25 |
| 5,666,562 A | * | 9/1997 | Kaneda et al. .............. 396/101 |
| 5,677,995 A | | 10/1997 | Mager ............................ 395/3 |
| 5,745,452 A | * | 4/1998 | Ko .......................... 369/44.29 |
| 5,864,526 A | * | 1/1999 | Le Carvennec .......... 369/44.35 |
| 6,011,762 A | * | 1/2000 | Watanabe et al. ......... 369/44.25 |

FOREIGN PATENT DOCUMENTS

| EP | 0 676 750 A | 10/1995 |
|---|---|---|
| JP | 03 015809 | 1/1991 |

* cited by examiner

*Primary Examiner*—Thang V. Tran
(74) *Attorney, Agent, or Firm*—Lisa K. Jorgenson; Robert Iannucci; Seed IP Law Group PLLC

(57) ABSTRACT

A control device for a focusing system of a compact disk (CD) reader is provided. The control device uses fuzzy logic incorporated to the audio data processing system of the CD reader which is adapted to detect and segregate a light beam reflected by the surface of the compact disk from an incident light beam to the surface. The fuzzy logic control device receives a focus error signal and a derivative of the focus error. It then calculates, using appropriate membership functions, output signals to provide to a focusing servo-system of the CD reader to adjust the distance of the focal plane from the light beam detecting circuitry.

16 Claims, 15 Drawing Sheets

CONTROL DEVICE FOR A CD READER FOCUSING SYSTEM USING FUZZY LOGIC

TECHNICAL FIELD

This invention relates to a control device for a Compact Disk (CD) reader focusing system using fuzzy logic, and more specifically relates to a control device adapted to detect and segregate a light beam reflected by the surface of the compact disk from an incident light beam to the surface.

BACKGROUND OF THE INVENTION

The invention, particularly but not exclusively, relates to a focusing control device for a source of monochromatic light in an audio data processing system of a CD reader, and the description which follows will cover that field of application for convenience of explanation.

Each CD reader contains two primary systems: an audio data processing system and a control servo-system. A CD reader is shown schematically at 1 in FIG. 1. The CD reader 1 has a data input terminal IN, a servo-control output terminal O1, and first O2 and second O3 data output terminals.

An audio data processing system 2 is connected between the data input terminal IN and the data output terminals O2 and O3, and includes a series of a buffer 4, an error corrector 5, an interpolation-muting (or concealment) and demultiplexing circuit 6, a digital filter 7, D/A converters 8 and 8', and analog output filters 9 and 9'.

The audio data processing system 2 also includes a storage device 10, such as a RAM, which is connected bi-directionally to the error corrector 5 and adapted to store the data during the audio data de-interleaving phase.

The input terminal IN of the CD reader 1 is connected to a series of a bit detection device 11, itself connected to the servo-control output terminal O1 via a control servo-system 3, and a demodulator 12. The CD reader 1 further includes a control/display subsystem 13 coupled to the demodulator 12 and to the buffer 4 of the audio data processing system 2. The control/display subsystem includes a series of a decoding block 14, a function controlling device 15, and a display 16.

The control servo-system 3 and the control/display subsystem 13 are to control the mechanical operations of the CD reader 1, including auto-tracking, auto-focus, and user's interface functions.

The data reading system 2 uses a semiconductor laser, the light beam of which must be kept on focus for tracking Pit. A motor is used for turning the disk at a constant linear velocity, as well as to change its speed according to the position of the pickup on the surface of the compact disk. The information supplied in the data is used for establishing the appropriate rotational rate and keeping the output data stream constant.

Finally, the CD reader 1 includes a clock signal generator block 17, having its input connected to the output of the bit detection device 11 and including a clock signal regenerator 18 connected to an elementary clock signal generator 19 which may be provided with a piezo-electric crystal 20.

As said before, the optical system of the CD reader 1 employs a monochromatic light source, specifically an output laser 21 (FIG. 2), which requires stabilization since it is a basically regenerative device with a temperature tied to the level of the output.

Thus, in order to extract an audio data signal, the audio data processing system 2 should be capable of segregating the reflected light beam from the incident light beam. This separation can be obtained essentially in either of two manners, schematically illustrated by FIGS. 2A and 2B. In FIG. 2A, a half-mirror 22 directs the light beam reflected from a disk 23 onto a light sensor 24. This known system is not very efficient because some of the light is lost along the direct transmission path.

FIG. 2B illustrates the combined use of a polarizing prism 25 and a quarter-wave plate for segregating the incident light beam from the reflected beam, this combination improves the system performance.

Both systems shown in FIGS. 2A and 2B employ a focusing laser lens LF as a means to focus the light beam.

The frequency response of a CD audio channel and the amount of crosstalk are functions of the spot size, that is to say, they are basic variables tied to the device optics.

The performance of a CD reader 1 is dependent on the detection and focusing of the light beam on the informational layer of a compact disk.

Devices effective to keep under control the system response to disturbance of large amplitude, by means of an algorithm based on binary logic, have been known, but such devices are complicated and low in efficiency.

Therefore, a major problem of the prior art CD readers is that the focusing systems cannot adequately control the system response to a disturbance of large amplitude in a simple and efficient manner.

SUMMARY OF THE INVENTION

Presented is a focusing system controller for a Compact Disk reader that uses fuzzy logic to control a focus error signal, and for driving a focusing servo-system of the Compact Disk reader to adjust the distance of the focal plane from the light beam reflected from the surface of the Compact Disk.

Embodiments of the invention can be practiced with other hardware devices without deviating from the inventive aspects. For instance embodiments can be adapted to work with Digital Video Disks (DVD). Further applications can be envisaged for a fuzzy controller used as herein in a Hard Disk (HD) or a Mini Disk (MD) control. Applications of this invention can extend to any system where a reading head must be kept within a given distance from another device to operate properly The features and advantages of a controller according to the invention will be apparent from the following description of an embodiment thereof, given by way of non-limitative example with reference to the accompanying drawings.

DETAILED DESCRIPTION

As mentioned above, the performance of a CD reader 1 is affected by the detection and focusing of the light beam on the informational layer of an optical disk or CD. Bends in the CD platter itself and the depth of its surface unevenness cause the focal plane to shift, so that a focusing servo-system must be used. The accuracy of this servo-system should be adequate to keep the focal plane at optimum range within an error of ±1 n$\mu$m.

Simulations have been carried out by the Applicant on a CD-ROM 8× reader whose characteristics are as specified by the Red Book standard, as is known in the art. This reader affords fast radial access and can operate within a wide range of temperatures.

Figure 3:
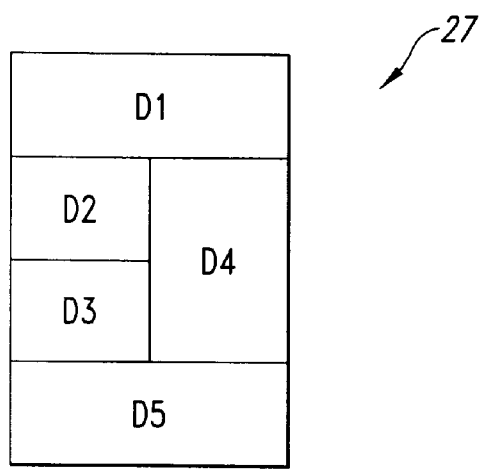
FIG. 3 is a block diagram of a photodiode type of optical mechanism.

In embodiments of this invention, a Single Foucault method is used for determining a focus error signal (Focus Error), i.e., a signal which enables the position of the focal point to be found. A photodiode type of optical mechanism 27, comprising five photodiodes, is shown in block form in FIG. 3. The photodiode optical mechanism 27 has two outboard diodes (D1, D5), referred to as the satellite diodes, which are used solely for tracking purposes, and three middle diodes (D2, D3, D4) which are used for determining the focus error signal (Focus Error).

Figure 4:
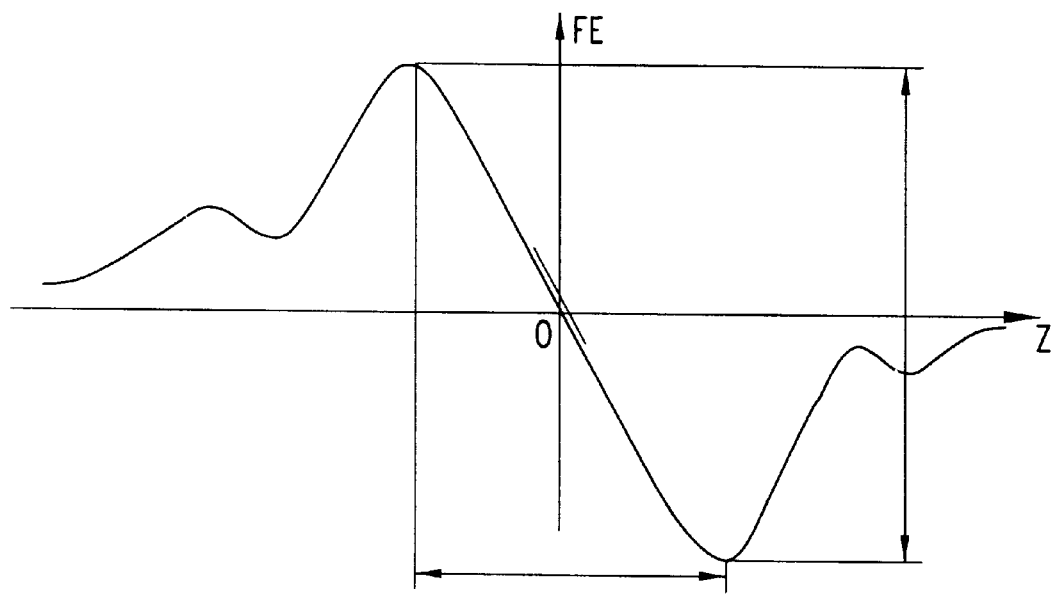
FIG. 4 is a theoretical plot of a focus error signal.

FIG. 4 is a theoretical plot of the focus error signal (Focus Error) as suitably normalized according to the following expression:

FEn=2*Error.

Figure 1:
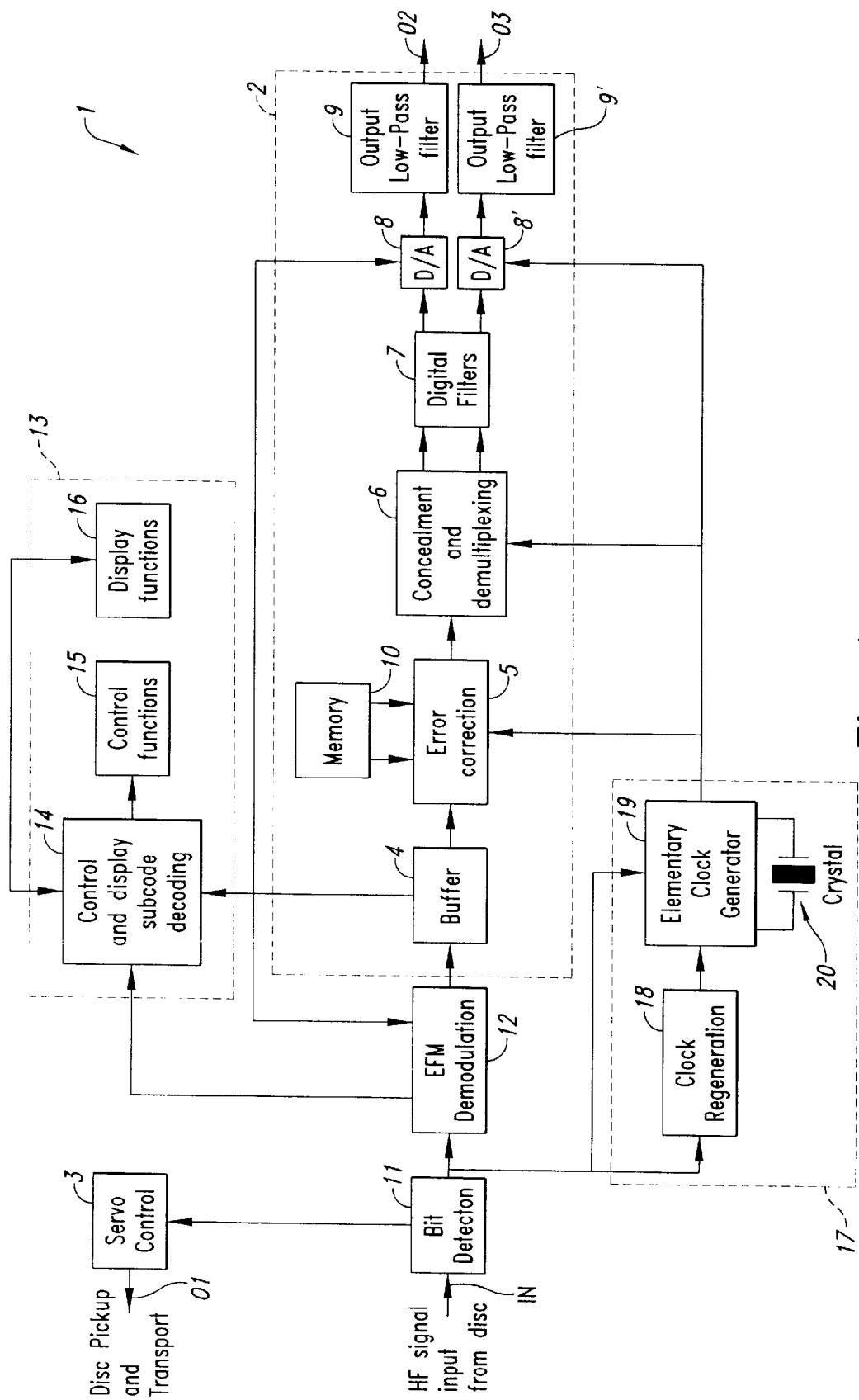
FIG. 1 is a schematic drawing of the structure of a conventional CD reader, incorporating an audio data processing system and a control servo-system.
Figure 2A:
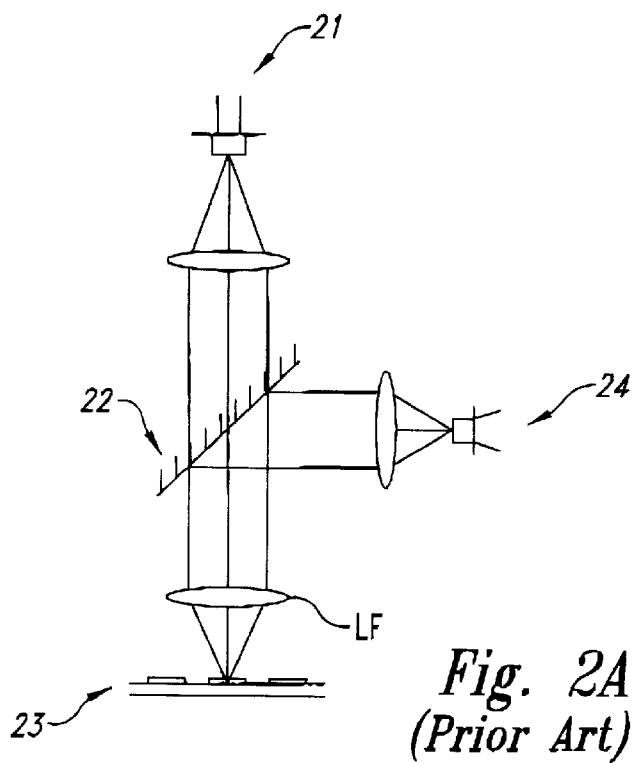
FIGS. 2A and 2B are diagrams illustrating first and second schemes for segregating a reflected light beam from an incident light beam, according to the prior art.
Figure 2B:
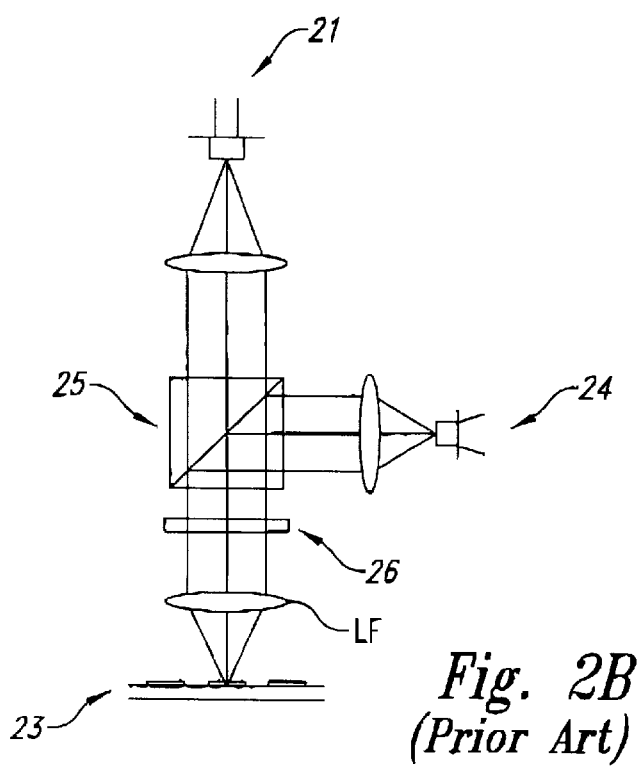

As is apparent from FIG. 4, the focus error signal (Focus Error) is a function of the displacement of the light beam focusing means, specifically, the focusing laser lens LF shown in FIGS. 2A and 2B which illustrate the state of the art.

On the graph of FIG. 4, the origin point of the axis z corresponds to the lens setting when the laser is properly focused.

From the pattern of the focus error signal FE, a controller CF of the audio data processing system 2 can be determined which is operative to keep the laser light source focused onto the compact disk surface. The design specifications for this controller CF come in two major classes: those covering the behavior of the controlled system in the steady-state or asymptotic condition; and those covering the behavior of the controlled system in the transient range, in response to canonical input signals.

In the instance considered, the controlled system is asymptotically stable. It should be further noted that the steady-state error is not required to be zero, because it will be sufficient for the system to have the laser lens set such that the light beam is focused within an error of 1 $\mu$m.

As for the behavior in the transient range, it is important to obtain a sufficiently large phase margin for the frequency response of the controlled system.

In particular, an acceptable minimum value for that margin may be 60°. In this way, the optical system can produce a prompt response, that is, will react quickly to stimuli.

In order for the system to be the quicker to respond, a rise time of less than 0.01 seconds in the frequency response is to be preferred.

Thus, the specifications for the photodiode optical system 27 can be itemized as follows: a steady-state error which need not be zero; a phase margin m$\phi$=60°; and a rise time ts≦0.01 sec.

The above specifications should be converted into useful parameters to synthesize the focusing system controller CF; in particular, once the phase margin and rise time have been decided upon, the corresponding values of the dampening factor and the cut-off frequency can be determined. The last-mentioned parameter can be useful to a synthesis method based on frequency response.

$$m\varphi = \frac{\Pi}{2} - \text{arctg}\frac{\sqrt{\sqrt{1+4\xi^4} - 2\xi^2}}{2\xi} \tag{1}$$

then, $$\xi = 0.61 \tag{2}$$

and since, $$t_s = \frac{1}{\omega_n}\frac{1}{\sqrt{1-\xi^2}}\left[\Pi - \text{arctg}\frac{\sqrt{1-\xi}}{\xi}\right] \tag{3}$$

then, $$\omega_n = 295$$

$$\omega_n = 293 \tag{4}$$

Therefore, a focusing system controller CF capable of implementing the above method should have the following transfer function:

$$R(s) = 1.51 + \frac{0.0044s}{1 + 0.000317s} \tag{5}$$

It can be at once appreciated that the s term in the denominator is so much smaller than 1 that it can be safely ignored, and the transfer function of a conventional PD (Proportional-Derivative) controller becomes:

$$R(s)=1.5(1+0.0044s) \quad (6)$$

A final consideration to be made about the controller just found concerns the controller capability to keep the system focused while the plant, i.e. the mechanical system and the lens, is subjected to vibration, which represents a major source of disturbance to a CD reader. For the purpose, the behavior of the control system in reverse feedback was simulated, with the addition of a noise input to the plant to simulate real vibration. The scheme adopted for this simulation is illustrated by FIG. 5, and the result of the simulation is reported in FIGS. 6A and 6B.

Figure 5:
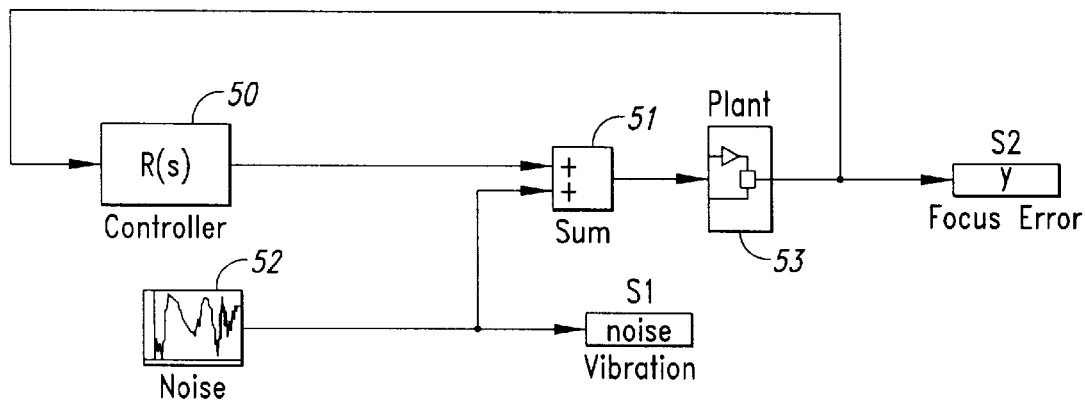
FIG. 5 shows a simulation setup for the PD (Proportional-Derivative) controller.

In particular, FIG. 5 shows in block form a controller 50 having the transfer function R(s) given by expression (6) above.

The controller 50 has its output connected to a summing node 51 which receives in parallel a signal representing the noise, schematically illustrated by a noise block 52 outputting a vibration signal S1. The summing node 51 is cascade connected to a plant block 53 which has an output fed back to the controller 50 input and arranged to supply a focus error signal S2.

Figure 6A:
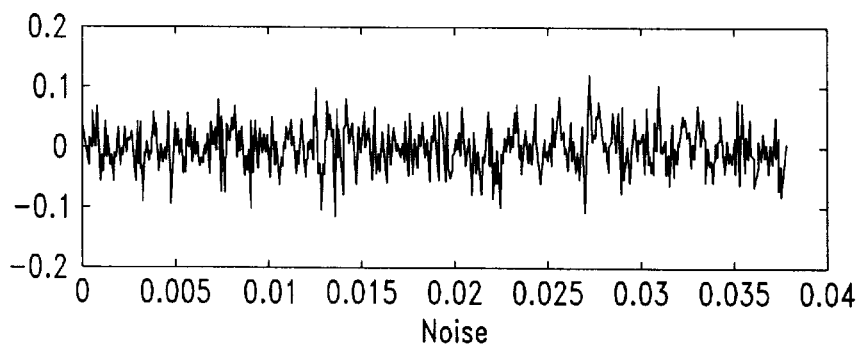
FIGS. 6A and 6B are graphs that show results of a simulation of FIG. 5.

The signal shown in FIG. 6A represents the noise S1 at the system input.

Figure 6B:
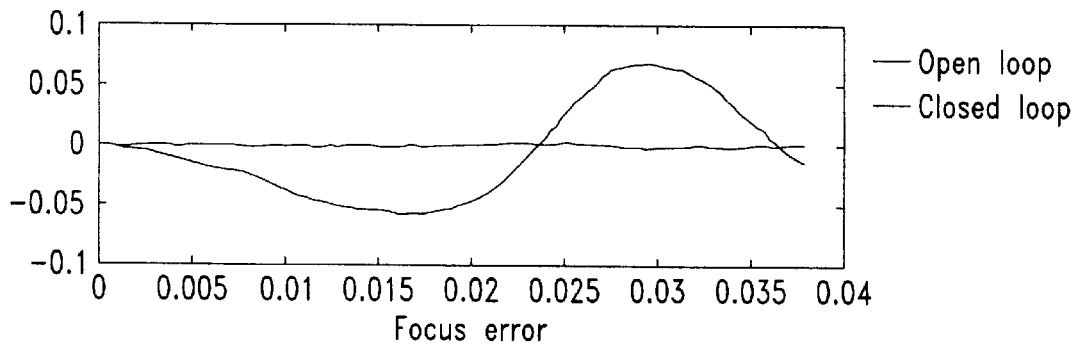

FIG. 6B shows that the focus error signal S2 is virtually zero even as the system is subjected to vibration.

In embodiments of this invention, based on the parameters yielded by this simulation, a fuzzy controller for the focus control system of the CD reader is provided by "fuzzifying" a standard controller R(s).

For the purpose, a special neuro-fuzzy system, and an associated algorithm developed by the Applicant and designated AFM, has been used giving a fuzzy model of a system to be generated from a measurement of its input/output data.

The first step of this process is the taking of measurements on the system to be modelled. To this aim, the Simulink toolbox of Matlab has been utilized which, based on the scheme shown in FIG. 7, allows the input data (error and error derivative) to the fuzzy controller and its output to be measured.

Figure 7:
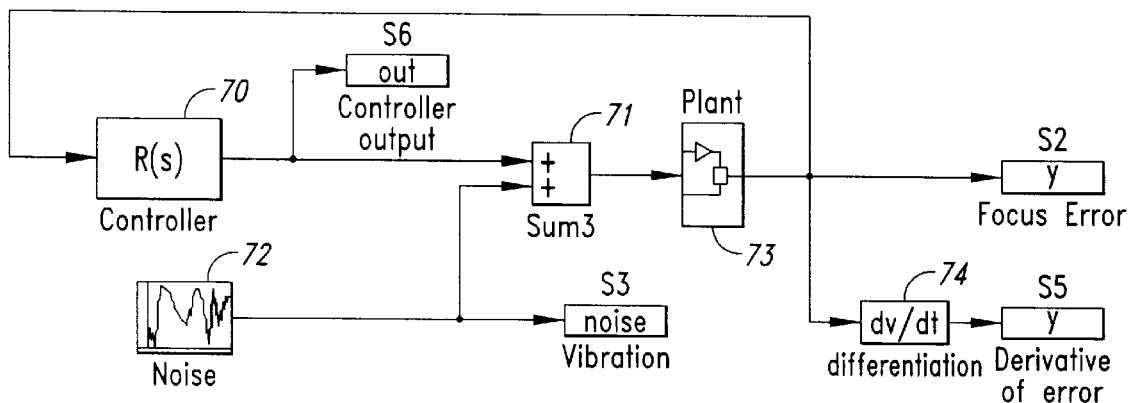
FIG. 7 is a block diagram that shows a simulation setup for obtaining a fuzzy controller from the PD controller of FIG. 5.

The scheme in FIG. 7 includes a controller 70 having its output connected to a summing node 71 which receives in parallel a signal representing the noise, schematically illustrated by a noise block 72 outputting a vibration signal S3. The summing node 71 is cascade connected to a plant block 73 which has an output fed back to the controller 70 input and arranged to supply a focus error signal S4.

The plant block 73 is also connected with its output to a differentiation block 74 adapted to supply a signal S5 being a derived function of the error S4. Also, a control output signal S6 is picked up from the controller 70 output.

Figure 8A:
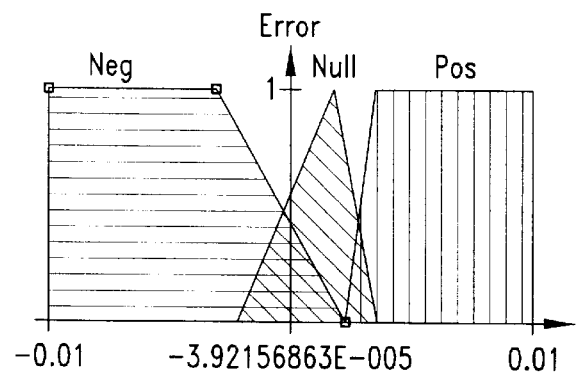
FIGS. 8A, 8B and 9 are graphs that show membership functions found from the setup of FIG. 7.
Figure 8B:
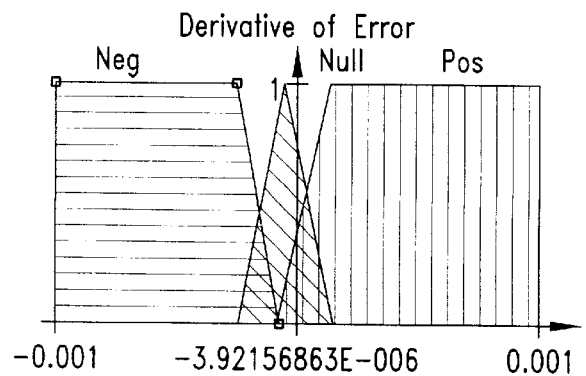
Figure 9:
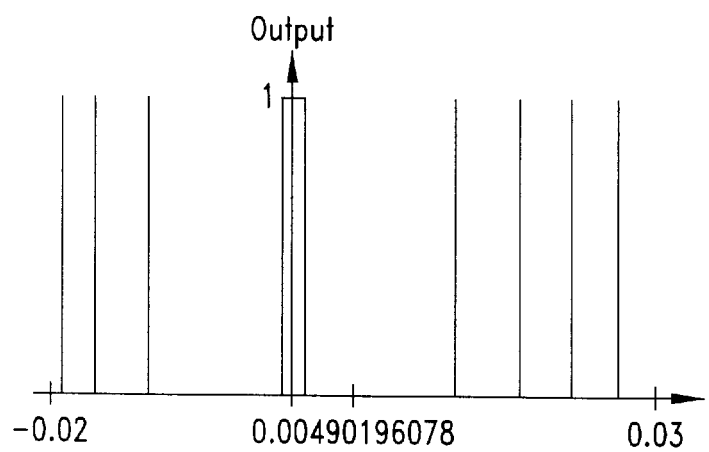

Using the AFM software, the fuzzy controller membership functions and rules have been obtained for the CD reader focusing system in accordance with an embodiment of the invention. Shown in FIGS. 8A and 8B are the membership functions Mbfs relating to the focus error signal (Focus Error) and its derivative signal (derror), respectively. FIG. 9 shows the membership function relating to the control output signal S6.

The fuzzy controller of this embodiment is defined by the following fuzzy inference rules:

IF error IS Neg AND derror IS Neg THEN du is a
IF error IS Neg AND derror IS Null THEN du is b
IF error IS Neg AND derror IS Pos THEN du is c
IF error IS Null AND derror IS Neg THEN du is d
IF error IS Null AND derror IS Null THEN du is e
IF error IS Null AND derror IS Pos THEN du is f
IF error IS Pos AND derror IS Neg THEN du is g
IF error IS Pos AND derror IS Null THEN du is h
IF error IS Pos AND derror IS Pos THEN du is h
where:
   Neg, Null and Pos denote negative, zero, and positive values, respectively, for the membership functions (MF in FIGS. 8A and 8B); and a, b, c, d, e, f, g, h and i denote the results to be applied to the control output signal shown in FIG. 9.

Figure 10A:
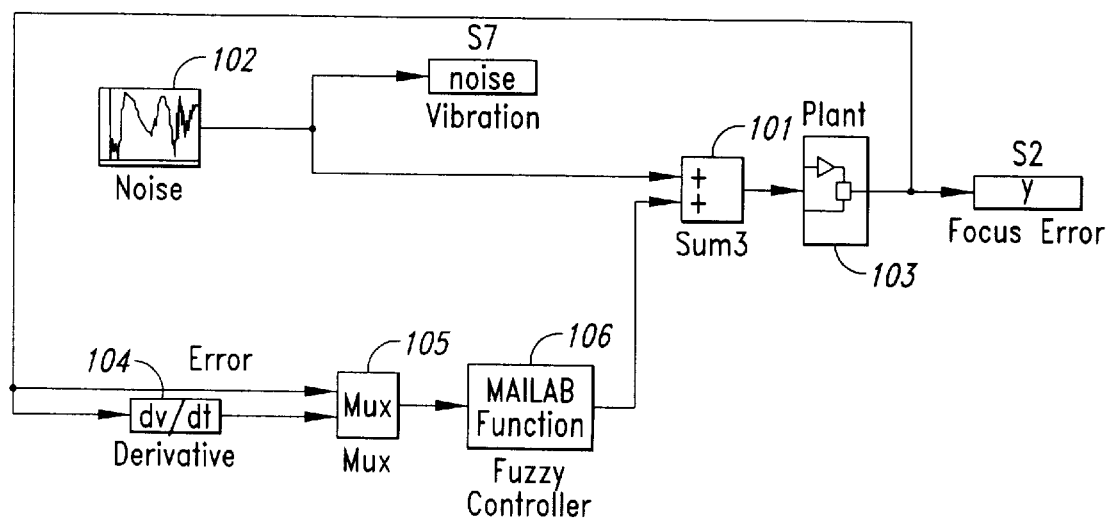
FIG. 10A is a block diagram that shows a further simulation setup for the fuzzy controller according to an embodiment of the invention.
Figure 10B:
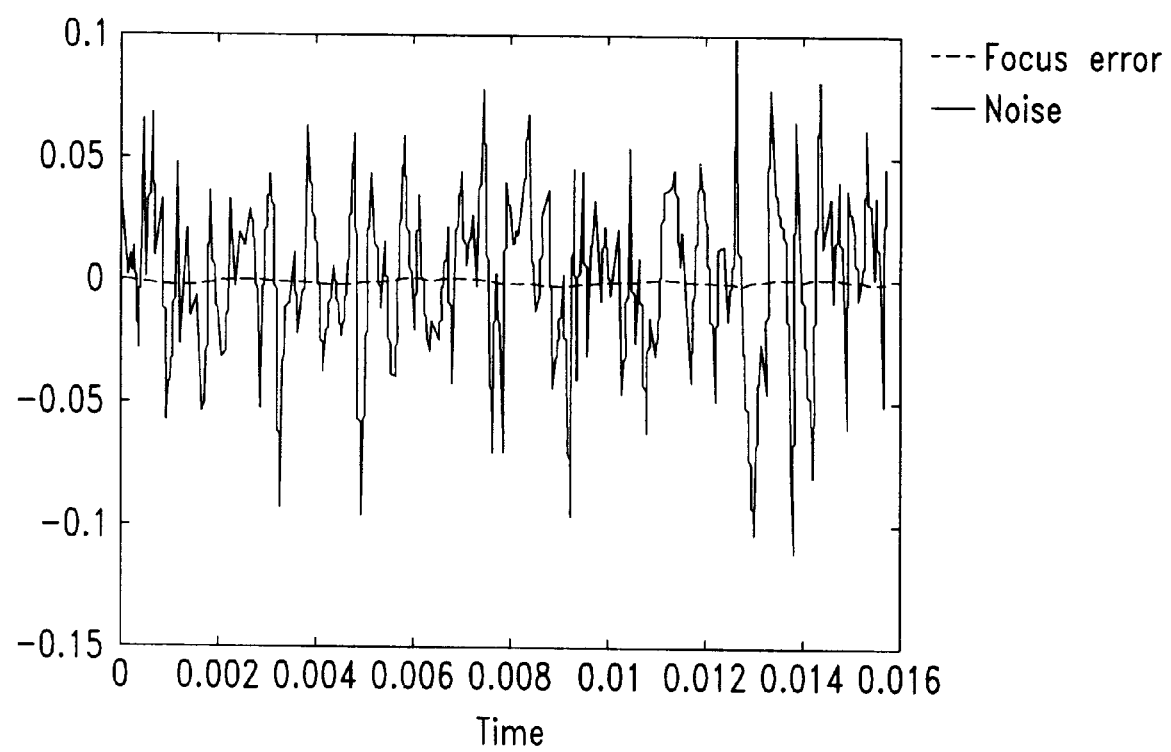
FIG. 10B is a graph that shows the results of the simulation of FIG. 10A.

To carry out simulations by Matlab of the fuzzy controller thus defined, a Matlab file has been created according to the scheme shown in FIG. 10A. The result of the simulation is shown in FIG. 10B.

The scheme shown in FIG. 10A provides for a summing node 101 to receive in parallel a signal representing the noise, schematically illustrated by a noise block 102 outputting a vibration signal S7. The summing node 101 is cascade connected to a plant block 103 having an output for supplying a focus error signal S8.

The plant block 103 is also connected with its output to a differentiation block 104, itself connected to a multiplexer 105 which is input the focus error signal S8 as well. The multiplexer 105 is further connected to a Matlab simulation block 106 representing the functions of the fuzzy controller according to an embodiment of the invention and being in turn connected to the summing node 101.

Figure 11:
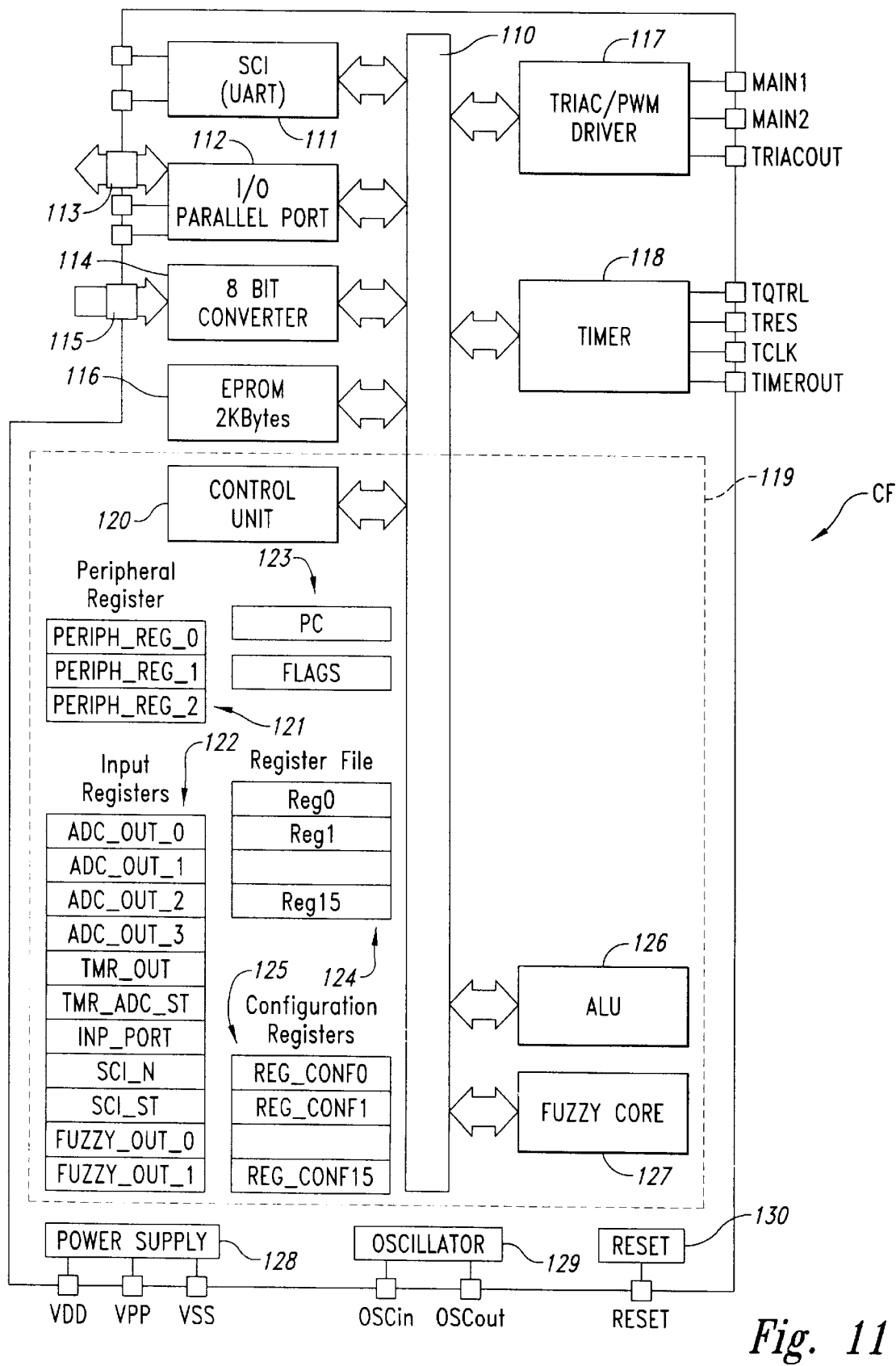
FIG. 11 is a schematic block diagram that shows the structure of a fuzzy controller according to an embodiment of the invention.

The fuzzy controller thus obtained is shown schematically in FIG. 11 and generally referenced CF. In particular, the controller CF is constructed around a central communications bus 110 which is connected bi-directionally to a transceiver block 111 connected with its input to a transmit terminal Tx and a receive terminal Rx; a parallel input/output (I/O) port 112 connected with its input to first PV and second READV terminals and connected bi-directionally to a data bus 113; an 8-bit analog-to-digital (A/D) converter connected with its input unidirectionally to another data bus 115; and a storage device 116, which in a preferred embodiment is specifically a 2-kbyte EPROM.

The central communications bus 110 is also connected bi-directionally to: a drive block 117 connected to first MAIN1 and second MAIN2 supply terminals, as well as connected to a drive terminal TRIACOUT; and a timer 118 connected to first TCTRL, second TRES, third TCLK and fourth TIMEROUT timing terminals.

The fuzzy controller CF includes a calculation subsystem 119 which is connected bi-directionally to the central communications bus 110 and includes: a control unit 120 acting on a first set of peripheral registers 121, a second set of input registers 122, a third set of signalling registers 123, a fourth set of storage registers 124, and a fifth set of formatting registers 125; a central calculation unit (ALU) 126; and a fuzzy device 127.

The fuzzy controller CF further includes: a power supply 128 connected to first VDD, second VPP and third VSS power supply terminals; an oscillator 129 connected to an input terminal OSCin and an output terminal OSCout; and a reset circuit 130 connected to a reset terminal RESET.

An important problem with conventional CD reader focusing systems is a loss of the focal point position in the presence of very strong disturbance. In fact, conventional controllers are unable to prevent such loss of the system focus.

Advantageously in embodiments of this invention, this problem is obviated through the use of fuzzy logic. Thus, a parallel controller is provided with a fuzzy algorithm that, as explained hereinafter, is quite simple, yet efficient.

The fuzzy model of the parallel controller is to generate, upon the main fuzzy system losing control, a ramp tending to restore the system to its previous condition.

For the purpose, an algorithm has been devised which can determine whether the lens has been moved away from or closer to the disk, and accordingly increase or decrease a variable for generating a ramp with the appropriate sign. During the time when this parallel controller is not required to operate, the fuzzy algorithm holds its output at zero level.

This algorithm is implemented with a single input variable, the error signal, three membership functions, and an output variable having one of three possible values: −1 to increase the variable; 0 when not required to act; and +1 to decrease the variable.

Figure 12A:
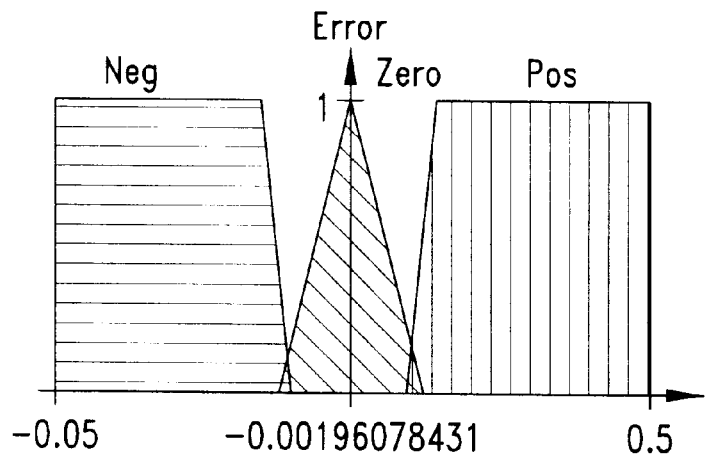
FIGS. 12A and 12B are graphs that show the membership functions of a parallel fuzzy controller.
Figure 12B:
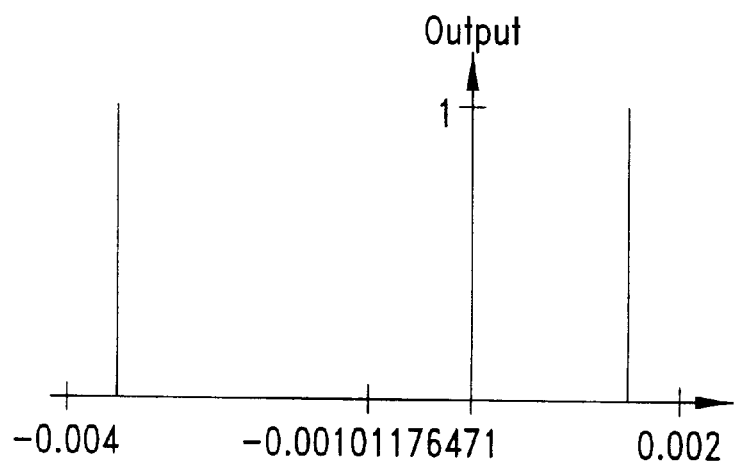

Shown in FIGS. 12A and 12B are the fuzzy sets of the variables corresponding to the error signals and the output signal, respectively. The rules of the fuzzy algorithm for the parallel controller of this invention are the following:

IF error IS Neg THEN out IS ml
IF error IS Pos THEN out IS pl
IF error IS Zero THEN out IS xl where:
 error is the membership function relating to the error signal input to the parallel controller;
 out is the membership function relating to the output signal from the parallel controller;
 Neg, Zero and Pos denote negative, zero and positive values, respectively, for the functions considered; and
 ml, pl and xl denote the results to be applied to the parallel controller output signal.

Figure 13:
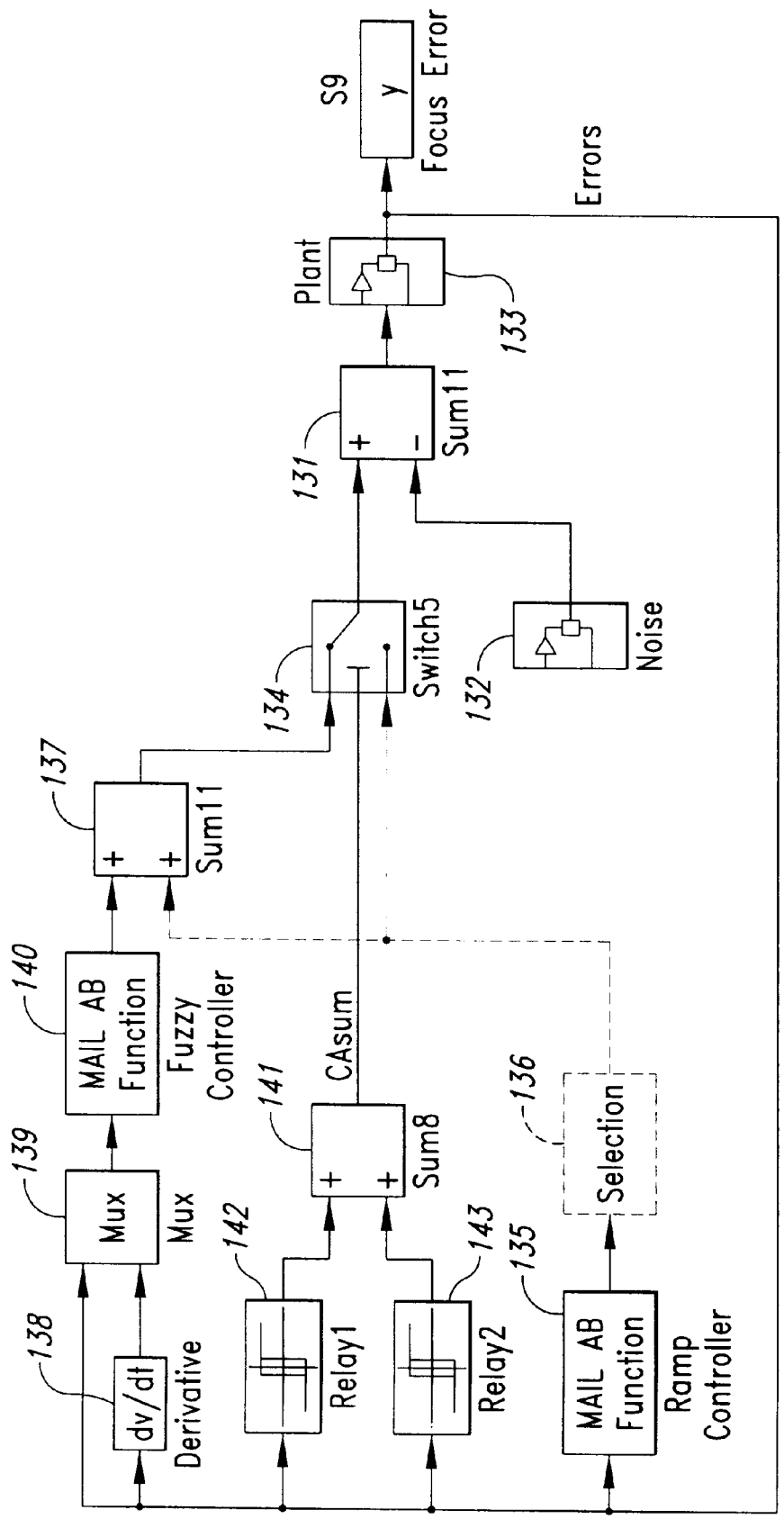
FIG. 13 is a block diagram that shows a simulation setup for an embodiment of the parallel fuzzy controller.

The Simulink scheme used is illustrated by FIG. 13. It provides a summing node 131 which receives in parallel a signal representing the noise, schematically illustrated by a noise block 132. The summing node 131 is cascade connected to a plant block 133 which has an output arranged to supply a focus error signal S9. The summing node 131 input is connected to a switch 134.

The scheme of FIG. 13 further provides a Matlab simulation block 135, representing the functions of the ramp-generating parallel controller, itself connected via a selection block 136 (shown in phantom lines to indicate discontinuity of connection) to the switch 134, and connected to a further summing node 137, itself connected with its input to a series of a differentiation block 138, a multiplexer 139 and a second Matlab simulation block 140 representing the function of the inventive controller, in turn connected to the summing node 137.

Finally, the input of the switch 134 is connected to yet another summing node 141, itself connected with its input to first 142 and second 143 relay blocks. The two relay blocks 142 and 143 are used to determine, in simulated form, the signal that in actual practice would be supplied by the system hardware.

Finally, the output from the plant block 133 is fed back to the differentiation block 138, and fed forward to the multiplexer 139, the relay blocks 142 and 143, and the first Matlab simulation block 135.

Figure 14:
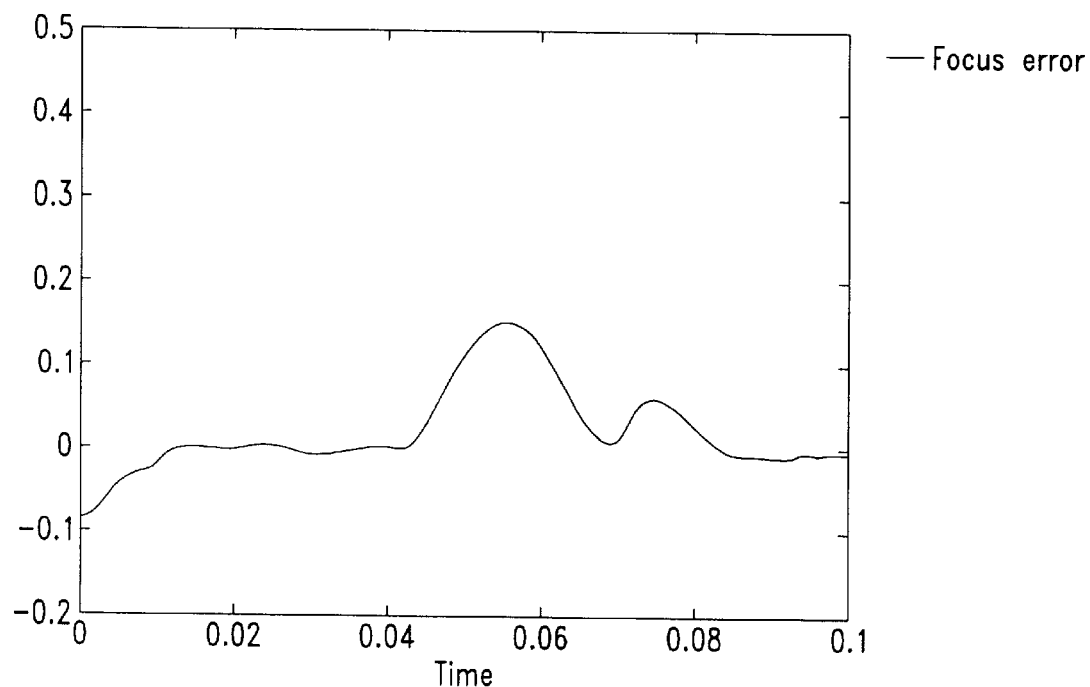
FIG. 14 is a chart that shows the results of the simulation of FIG. 13.

FIG. 14 shows the results of the simulation.

Thus, the resultant fuzzy controller can solve the problem of the system responding to disturbance of large amplitude, in a simpler and more efficient manner than by utilizing an algorithm based on binary logic.

To confirm the improved performance brought about by the fuzzy controller of the invention, this has been tested in comparison with a conventional PD (Proportional-Derivative) controller.

Figure 15:
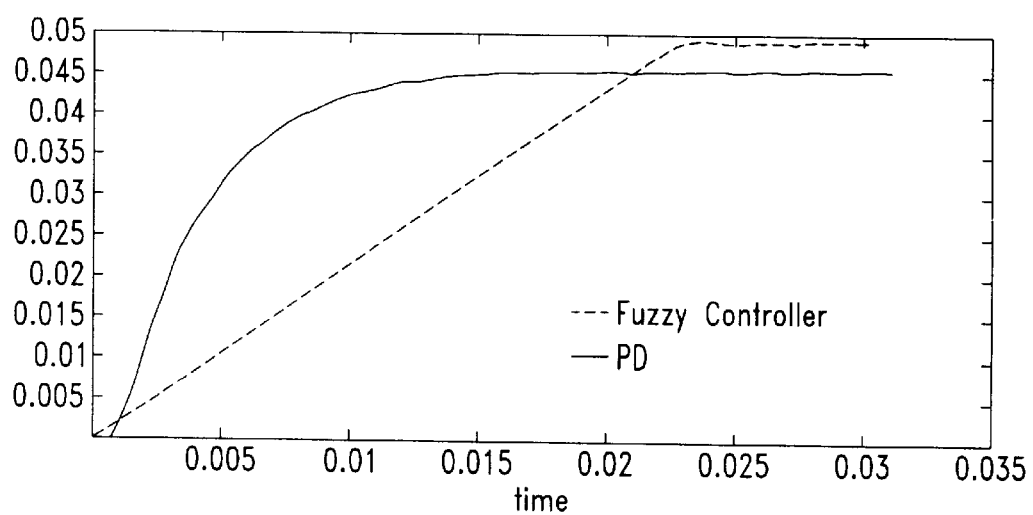
FIG. 15 is a graph that shows the results of comparing the performance of a conventional controller with that of a fuzzy controller according to an embodiment of the invention.

The comparative test concerned the response of the system controlled by the fuzzy controller (not the parallel controller) to an input having an amplitude step of 0.05. The test result is as shown in FIG. 15.

Although the PD (Proportional-Derivative) controller gives a faster response, the fuzzy controller of this embodiment of invention has proved more efficient in determining the focal point position. In fact, the final position error is approximately 0.005, corresponding to a 3.25 $\mu$m deviation from true focus position for the PD (Proportional-Derivative) controller, and approximately 0.001, corresponding to a 0.65 $\mu$m deviation from true focus position for the fuzzy controller.

It should be noted that a zero error is not needed, i.e. the lens is not required to be set exactly, and that it is enough for the error to be held within ±1 $\mu$m of the true position. It seems safe to conclude, therefore, that unlike the PD (Proportional-Derivative) controller, the fuzzy controller fills this demand by a good margin.

For testing on the real system, a previously designed fuzzy adjuster has been implemented on a microprocessor sold by the Applicant as brand ST52, using the Fuzzystudio 3.0 development system.

Figure 16:
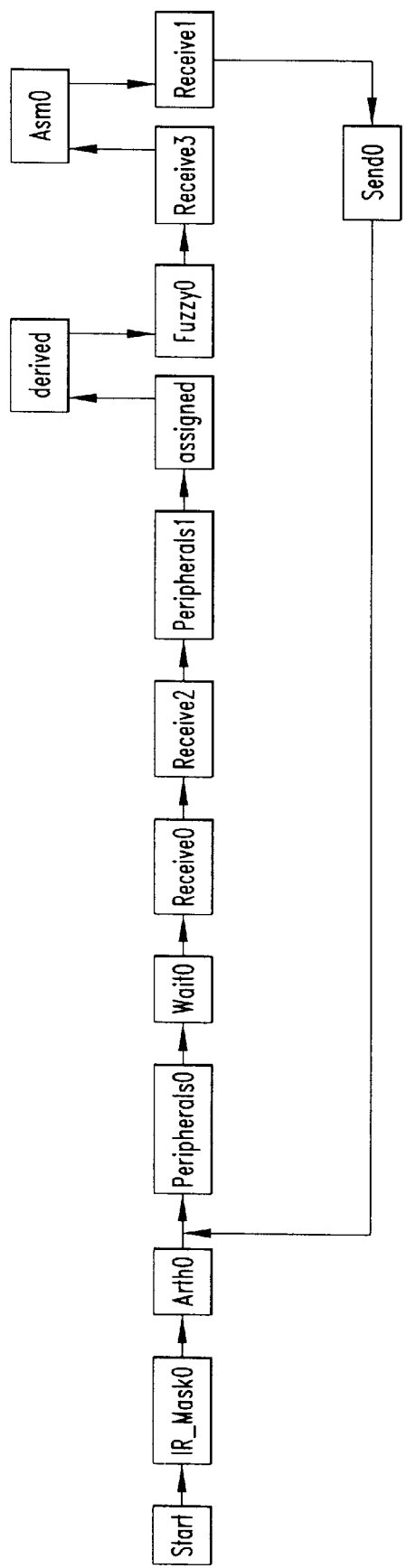
FIG. 16 is a block diagram that illustrates a fuzzy development system of the fuzzy controller according to an embodiment of the invention.

The fuzzy development scheme thus obtained for the controller of this embodiment of the invention is illustrated by FIG. 16. This scheme provides in particular a fuzzy block, Fuzzy0, whereinto the rules and fuzzy sets of the algorithm to be implemented are placed.

Figure 17A:
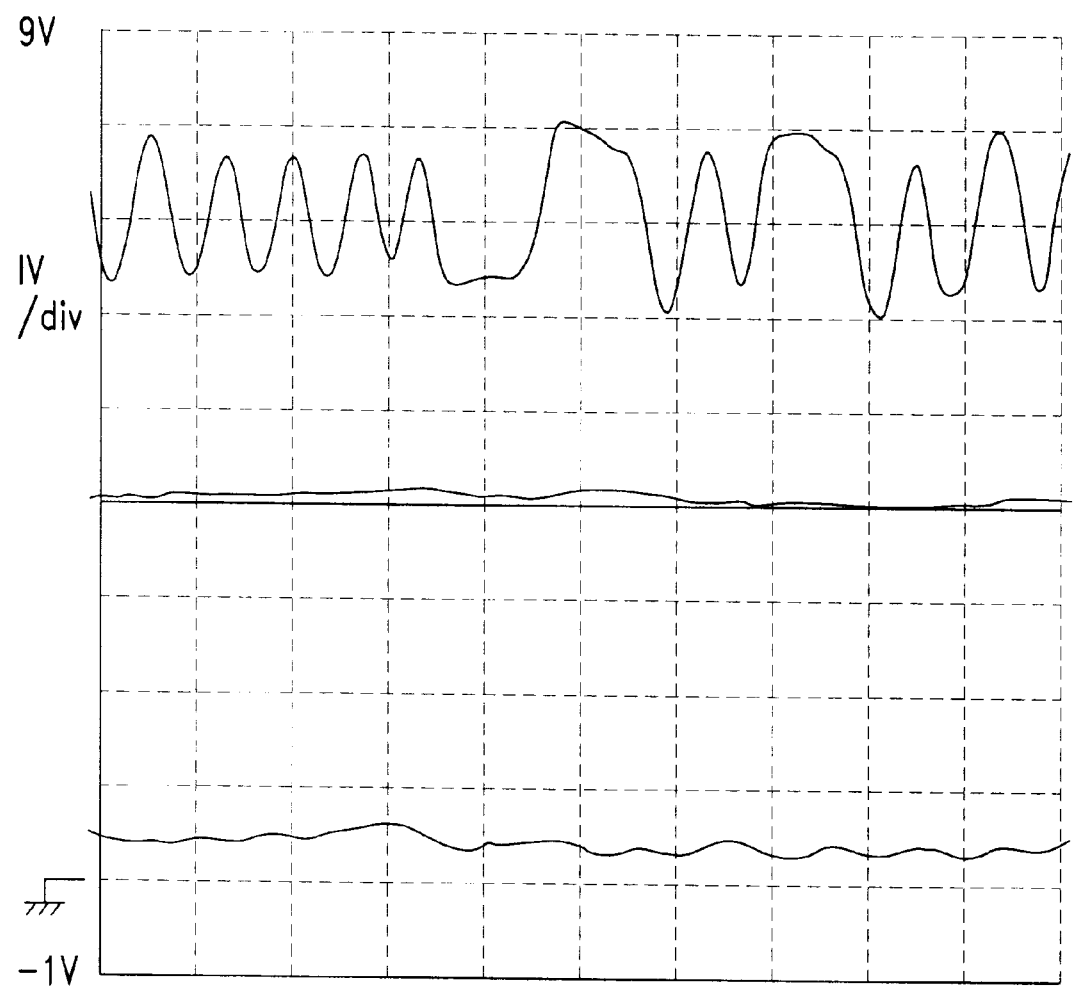
FIGS. 17A and 17B are graphs that show the results of a simulation at with oscilloscope signals obtained with the fuzzy controller of an embodiment of this invention.
Figure 17B:
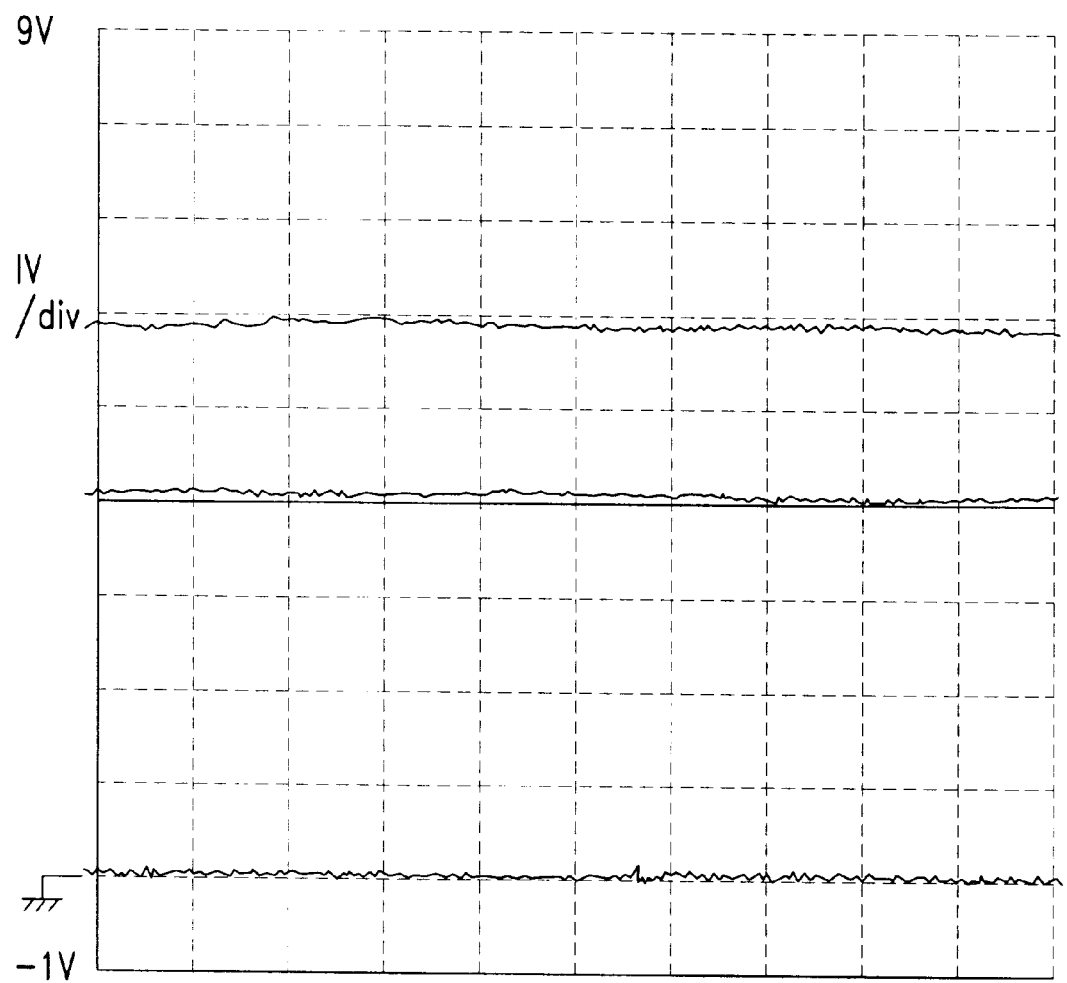

To best demonstrate the results of a fuzzy controller thus formed, three signals have been displayed on the oscilloscope, namely: a focus error signal (Focus Error), a focusing signal (CASUM (Central Aperture SUM)), and a digital information signal (Hf), as plotted in FIGS. 17A and 17B.

The proper operation of the controller is confirmed by the focus error signal (Focus Error) being held around a zero value and the focusing signal (CASUM) held at a high level.

As a further confirmation, the digital information signal Hf, from which signal the digital information is extrapolated, shows to be other than zero, and more precisely a varying signal. It should indeed be considered how a major feature of the signal Hf is that, when the system is out of focus, it would be at a zero level, whereas with the system focused—as it happens to be in this case—it would be other than zero or otherwise vary.

Advantageously in embodiments of this invention, the fuzzy controller can be optimized by means of genetic algorithms.

Figure 18:
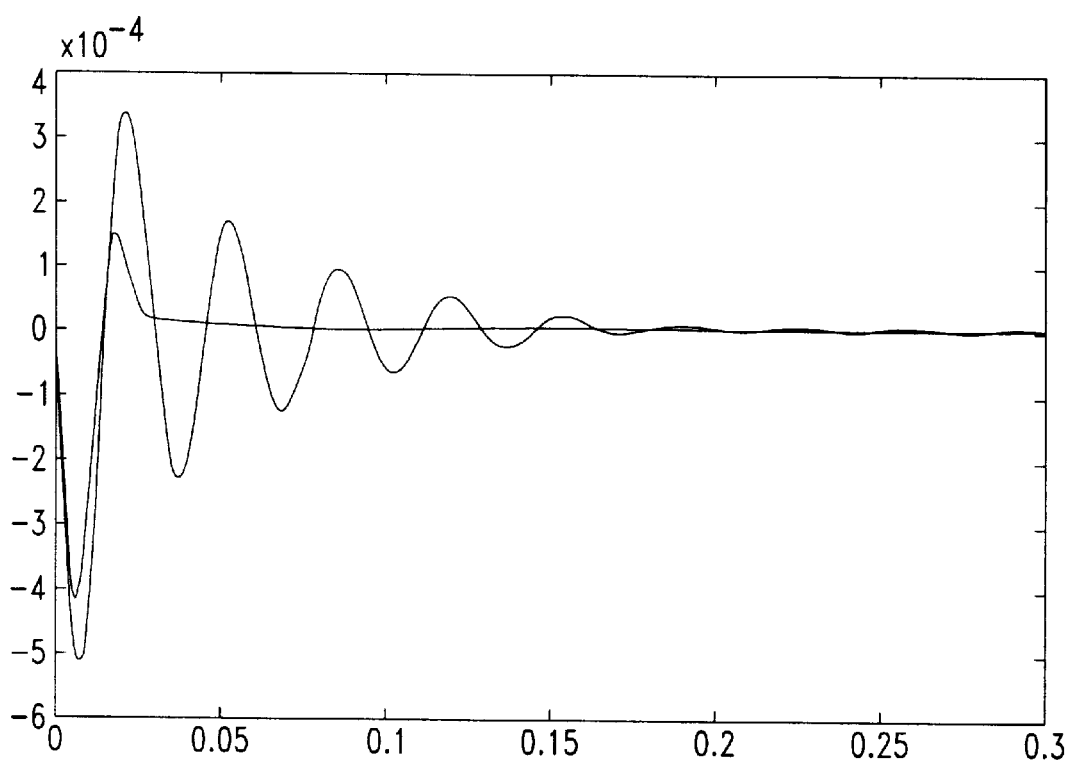
FIG. 18 is a graph that shows the result of a simulation carried out on a further embodiment of the fuzzy controller according to the invention.

In particular, the fuzzy controller described hereinabove has been optimized by varying its parameters within ±10% of the interpolated value, and using for disturbance a pulse having the following characteristics: step time=0.001; initial value=0.3; final value=0. The results of the simulation are reported in FIG. 18.

It can be seen that the error value changes from 1.823e-5 (heavy line) for the standard fuzzy controller, to 6.204e-6 for the optimized version. Additional simulations have been carried out at different disturbance inputs, which all gave satisfactory results.

As described in the foregoing, the use of fuzzy logic effectively overcomes the problem of the focus control system response to disturbance of large amplitude, in a simpler and more efficient way than by using an algorithm based on binary logic.

Also noteworthy is that the fuzzy control described above in connection with the focusing system would be equally applicable to other systems, e.g. to auto-tracking.

Changes can be made to the invention in light of the above detailed description. In general, in the following claims, the terms used should not be construed to limit the invention to the specific embodiments disclosed in the specification and the claims, but should be construed to include all methods and devices that are in accordance with the claims. Accordingly, the invention is not limited by the disclosure, but instead its scope is to be determined by the following claims.

What is claimed is:

1. A focusing system control device incorporated in an audio data processing system of a compact disk reader adapted to detect and segregate a light beam reflected by a surface of a compact disk from an incident light beam to the surface, the compact disk reader also including a focusing servo-system coupled to a light beam detecting system, the control device comprising:
   a fuzzy logic controller adapted to determine a focus error signal and provide control signals to the focusing servo-system of the compact disk reader in order to adjust a distance of a focal plane from a light beam detecting system; and
   a parallel controller to receive the focus error signal and operatively coupled to the focusing servo-system, the parallel controller being adapted to generate a ramp signal tending to restore the focusing system control device from a lockup condition.

2. The focusing system control device according to claim 1, further comprising:
   a photodiode optical mechanism comprising two outboard photodiodes adapted to tracking a track signal of the compact disk reader, and three middle diodes adapted to determine the focus error signal.

3. The focusing system control device according to claim 1 wherein the fuzzy logic controller has the following transfer function:

$$R(s) = 1.5 \frac{1 + 0.0044s}{1 + 0.000317s}.$$

4. The focusing system control device according to claim 1 wherein the fuzzy logic controller has a first fuzzy input variable of the focus error signal; the fuzzy logic controller has a second fuzzy input variable corresponding to the derivative of the focus error signal; the fuzzy logic controller has a fuzzy output variable corresponding to an output signal of the fuzzy logic controller; and wherein the fuzzy logic controller is defined by means of the following fuzzy inference rules:
   IF error IS Negative AND derror IS Negative THEN a first result is applied to the fuzzy output variable;
   IF error IS Negative AND derror IS Zero THEN a second result is applied to the fuzzy output variable;
   IF error IS Negative AND derror IS Positive THEN a third result is applied to the fuzzy output variable;
   IF error IS Zero AND derror IS Negative THEN a fourth result is applied to the fuzzy output variable;
   IF error IS Zero AND derror IS Zero THEN a fifth result is applied to the fuzzy output variable;
   IF error IS Zero AND derror IS Positive THEN a sixth result is applied to the fuzzy output variable;
   IF error IS Positive AND derror IS Negative THEN a seventh result is applied to the fuzzy output variable;
   IF error IS Positive AND derror IS Zero THEN an eighth result is applied to the fuzzy output variable; and
   IF error IS Positive AND derror IS Positive THEN a ninth result is applied to the fuzzy output variable.

5. The focusing system control device according to claim 1 wherein the parallel controller includes a representation of an algorithm adapted to determine whether the light beam detecting system has been moved away from or closer to a compact disk loaded into the compact disk reader, and accordingly increasing or decreasing a variable to generate said ramp with an appropriate sign.

6. The focusing system control device according to claim 5 wherein the representation of the algorithm of the parallel controller maintains a zero output value when the focusing system control device is not in a lockup condition.

7. The focusing system control device according to claim 6 wherein the representation of the algorithm of the parallel controller contains an input variable corresponding to the error signal and defined by a plurality of membership functions, and an output variable which can take: any of the following three values:
   −1 to generate a positive ramp;
   0 when said controller is not required to act; or
   +1 to generate a negative ramp.

8. The focusing system control device according to claim 7, wherein the parallel controller, is defined by means of the following fuzzy rules:
   IF the parallel controller input IS Negative THEN the parallel controller generates a first signal on an output;
   IF the parallel controller input IS Positive THEN the parallel controller generates a second signal on the output; and
   IF the parallel controller input IS Zero THEN the parallel controller generates a third signal on the output.

9. A compact disk reader, comprising:
   an audio data processing system provided with a focusing servo-system coupled to a light beam detecting system; and
   a focusing system control device integrated with the audio data processing system and having:
      a fuzzy logic controller adapted to determine a focus error signal and to provide control signals to the focusing servo-system to adjust a distance of a focal plane from the light beam detecting system; and
      a parallel controller to receive the focus error signal and operatively coupled to the focusing servo-system, the parallel controller being adapted to generate a ramp signal tending to restore the focusing control device from a lockup condition.

10. A method of maintaining a focal plane distance of a light beam detecting system within given tolerance, the method comprising:
   determining a focus error signal;
   calculating a derivative of the focus error signal;
   providing the focus error signal and the derivative of the focus error signal as first and second input signals to a fuzzy logic controller;
   determining, in the fuzzy logic controller, a controlling signal based on the values of the first and second input signals;
   generating, in the fuzzy logic controller, an output signal based on the controlling signal;
   providing the output signal of the fuzzy logic controller to a focal plane distance adjuster;

providing the first input signal to a second fuzzy logic controller;

determining, in the second fuzzy logic controller, a ramp controlling signal based on a value of the first input signal; and providing the ramp controlling signal to the focal plane distance adjuster.

11. The method of claim 10 wherein providing the output signal the fuzzy logic controller to a focal plane distance adjuster comprises coupling the output signal of the fuzzy logic controller to a focusing servo-system.

12. The method of claim 11 wherein coupling the output signal of the fuzzy logic controller to a focusing servo-system comprises coupling the output signal of the fuzzy logic controller to a focusing servo-system of a compact disk reader.

13. The method of claim 10 wherein determining a controlling signal based on the values of the first and second input signals comprises applying a series of first membership functions to the first and second input signals to determine the controlling signal.

14. The method of claim 13 wherein the series of membership functions are based on whether the first and second input signals are positive, negative, or zero.

15. The method of claim 10 wherein determining a ramp controlling signal based on the value of the first input signal comprises applying second membership functions to the first input signal to determine the ramp controlling signal.

16. The method of claim 15 wherein the second membership functions are based on whether the first input signal is positive, negative, or zero.

* * * * *